United States Patent
Sugiura et al.

(10) Patent No.: US 7,196,502 B2
(45) Date of Patent: Mar. 27, 2007

(54) SWITCHING REGULATOR HAVING SOFT START CIRCUIT

(75) Inventors: Masakazu Sugiura, Chiba (JP); Yoshikazu Kurusu, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/998,912

(22) Filed: Nov. 29, 2004

(65) Prior Publication Data

US 2005/0134241 A1 Jun. 23, 2005

(30) Foreign Application Priority Data

Dec. 10, 2003 (JP) ............................. 2003-411621

(51) Int. Cl.
*G05F 1/573* (2006.01)
*G05F 1/565* (2006.01)

(52) U.S. Cl. ...................... 323/274; 323/277; 323/901; 323/908

(58) Field of Classification Search ................ 323/274, 323/277, 276, 901, 908
See application file for complete search history.

(56) References Cited

U.S. PATENT DOCUMENTS

| | | | | |
|---|---|---|---|---|
| 6,150,800 A | * | 11/2000 | Kinoshita et al. | ............ 323/280 |
| 6,377,480 B1 | * | 4/2002 | Sase et al. | ..................... 363/49 |
| 6,445,167 B1 | * | 9/2002 | Marty | ......................... 323/280 |
| 6,836,102 B2 | * | 12/2004 | Sudou | ......................... 323/282 |

* cited by examiner

*Primary Examiner*—Bao Q. Vu
(74) *Attorney, Agent, or Firm*—Adams & Wilks

(57) ABSTRACT

A switching regulator has a soft start circuit having a current source, a capacitor, and a MOS transistor connected between the current source and the capacitor for undergoing controlled operations between ON/OFF states to control a time period required for soft start of the switching regulator.

3 Claims, 1 Drawing Sheet

SWITCHING REGULATOR HAVING SOFT START CIRCUIT

BACKGROUND OF THE INVENTION

1. Field of the Invention

The present invention relates to a switching regulator having a soft start circuit for suppressing a rush current for charging an output capacitor with electricity upon turn-ON of a power supply for the switching regulator.

2. Description of the Related Art

A general step-up switching regulator having a soft start circuit is configured in the form of a circuit as shown in FIG. 2.

An input power supply 8 is connected between one terminal of a coil 9 and GND. The other terminal of the coil 9 is connected to a drain of a switching transistor 7 and an anode of a rectifying diode 10. A cathode of the rectifying diode 10 is connected to one terminal of a voltage division resistor 3, one terminal of an output capacitor 11 and one terminal of a load 12. A voltage division output obtained through voltage division between the voltage division resistors 3 and 4 is connected to a minus terminal of an error amplifying circuit 5. An output of a reference voltage circuit 1 is connected to a plus terminal of the error amplifying circuit 5 through a soft start circuit 2. Also, an output of the error amplifying circuit 5 is connected to a gate of the switching transistor. 7 through a duty control circuit 6.

The error amplifying circuit 5 compares a voltage obtained by controlling a start time of the reference voltage using the soft start circuit 2 with a voltage obtained by dividing an output voltage using the voltage division resistors 3 and 4. An ON/OFF time of the switching transistor 7 is controlled with an output as the comparator results through a duty control circuit 6 so as to make the output voltage constant.

The function of the soft start circuit 2 is to cause the output from the reference voltage circuit 1 to rise slowly for a time period of several milliseconds, thereby preventing a rush current upon turn-ON of the power supply.

An example of a circuit configuration of a conventional soft start circuit is shown in FIG. 3.

A MOS transistor 13 is connected between an input terminal 21 and an output terminal 22. One of the terminals of each of a current source 15 and a capacitor 14 are connected to a gate of the MOS transistor 13. Since upon turn-ON of a power supply the current source 15 charges the capacitor 14 with electricity, a gate voltage of the MOS transistor 13 gradually rises. Thus, since an ON resistance of the MOS transistor 13 gradually decreases, a voltage inputted to the error amplifying circuit 5 slowly rises. In such a manner, while the output voltage upon turn-ON of the power supply is low, the reference voltage used for comparison is caused to gradually rise to realize the soft start (refer JP 10-271680 A for example).

However, the conventional soft start circuit necessarily acts on the output of the reference voltage circuit upon turn-ON of the power supply. Hence, there is encountered such a problem that even in an inspection process, the output voltage of the switching regulator does not become a desired voltage unless a time period required for the soft start elapses whenever the power supply is turned ON, which exerts an influence on the inspection time.

SUMMARY OF THE INVENTION

In light of the foregoing, the present invention has been made in order to solve the above-mentioned problem associated with the prior art, and it is, therefore, an object of the present invention to provide a switching regulator in which a MOS transistor is provided between a current source and a capacitor for determination of a time period required for soft start, and thus the time period required for soft start can be controlled by controlling turn-ON/OFF of the MOS transistor as may be necessary.

The switching regulator of the present invention can arbitrarily change the presence and absence of the time period required for soft start over to each other, and hence there is offered an effect in that an inspection time or the like can be shortened.

DETAILED DESCRIPTION OF THE PREFERRED EMBODIMENTS

Figure 1:
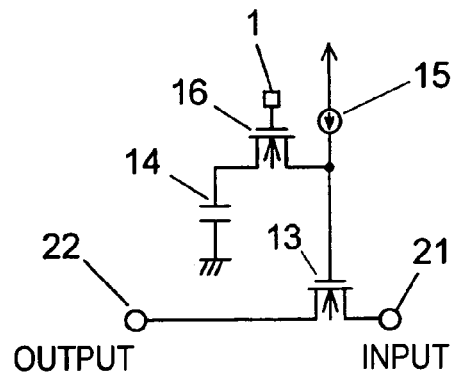
FIG. 1 is a circuit diagram of a soft start circuit of a switching regulator according to an embodiment of the present invention.
Figure 2:
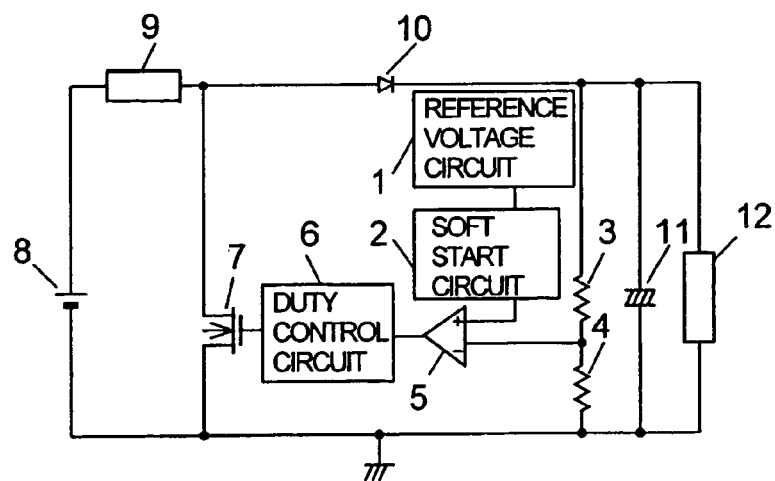
FIG. 2 is a circuit diagram, partly in circuit diagram, of a general step-up type switching regulator.
Figure 3:
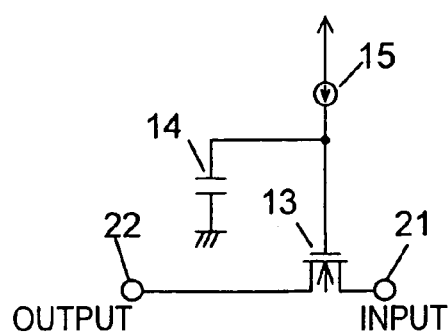
FIG. 3 is a circuit diagram of a soft start circuit of a conventional switching regulator.

FIG. 1 is a circuit diagram of a soft start circuit of a switching regulator according to an embodiment of the present invention. The configuration of the MOS transistor 13, the capacitor 14 and the current source 15, as well as input 21 and output 22, is the same as that in the related art. In the soft start circuit of the switching regulator according to this embodiment of the present invention, a MOS transistor 16 having a gate connected to a soft start switching input terminal 17 is provided between the capacitor 14 and the gate of the MOS transistor 13.

Next, a description will hereinafter be given to an operation of the soft start circuit of the switching regulator according to this embodiment of the present invention. While the MOS transistor 16 is in a turn-ON state, the soft start circuit operates similarly to the case of the conventional soft start circuit 2. On the other hand, upon turn-OFF of the MOS transistor 16, since only the gate of the MOS transistor 13 is connected to the current source 15, a gate voltage of the MOS transistor 13 immediately rises and hence the MOS transistor 13 is turned ON.

When the power supply is normally turned ON, a high voltage is inputted to the soft start switching input terminal 17 to turn ON the MOS transistor 16 so that the normal soft start operation starts.

On the other hand, when the power supply is turned ON to carry out a process inspection, and so forth, a low voltage is inputted to the soft start switching input terminal 17 to turn OFF the MOS transistor 16. At this time, since the gate voltage of the MOS transistor 13 immediately rises to turn ON the MOS transistor 13, the output from the reference voltage circuit 1 is inputted to the error amplifying circuit 5 at once. Consequently, the time period required for the soft start can be shortened, and hence the output voltage can be set to a desired voltage.

That is to say, turn-ON/OFF of the MOS transistor 16 can be controlled in accordance with the level of the output voltage to the soft start switching input terminal 17 to arbitrarily control the time period required for the soft start.

In this embodiment, a description has been made to step-up type switching regulator as an example. However, it is understood that even in case of a step-down type switching regulator and any other type of switching regulator, their soft start circuits have substantially the same circuit configuration, and thus the same effect can be obtained.

What is claimed is:

1. A switching regulator comprising:
an output terminal;
a power supply;
a coil connected to a terminal of the power supply;
a diode connected between the coil and the output terminal;
a voltage dividing circuit connected to the output terminal;
a reference voltage circuit;
a current source;
a first MOS transistor having a gate connected to the current source and a source connected to the reference voltage dividing circuit;
a second MOS transistor for controlling a soft start time period in accordance with a level of an output voltage to a soft start control terminal, the second MOS transistor having a source connected to the current source and a gate connected to the soft start control terminal;
a capacitor connected to a drain of the second MOS transistor;
an error amplifying circuit connected to an output of the voltage dividing circuit and a drain of the first MOS transistor;
a duty control circuit connected to the error amplifying circuit; and
a switching transistor having a gate connected to the duty control circuit and a source connected to the coil.

2. A switching regulator comprising:
an output terminal;
a power supply;
a coil connected to a terminal of the power supply;
a diode connected between the coil and the output terminal;
a voltage dividing circuit connected to the output terminal;
a error amplifying circuit connected to an output of the voltage dividing circuit;
a duty control circuit connected to the error amplifying circuit;
a switching transistor having a gate connected to the duty control circuit and a source connected to the coil;
a reference voltage circuit; and
a soft start circuit comprised of a capacitor, a current source, a first MOS transistor, and a second MOS transistor for undergoing controlled operations between ON/OFF states to control a time period required for soft start of the switching regulator, the first MOS transistor having a drain connected to the error amplifying circuit, a gate connected to the current source and a source connected to the reference voltage circuit, and the second MOS transistor having a source connected to the current source and a drain connected to the capacitor.

3. A switching regulator according to claim 2; wherein the second MOS transistor undergoes controlled operations between ON/OFF states to arbitrarily control a time period required for soft start of the switching regulator by control of a time period required to charge the capacitor with electricity using the second MOS transistor.

* * * * *